(No Model.)

J. CHATTAWAY.
SAWBUCK.

No. 482,162. Patented Sept. 6, 1892.

Attest
A. Donaldson
F. L. Middleton

Inventor
Joseph Chattaway
by Ellis Spear
Atty.

UNITED STATES PATENT OFFICE.

JOSEPH CHATTAWAY, OF PETOSKEY, MICHIGAN.

SAWBUCK.

SPECIFICATION forming part of Letters Patent No. 482,162, dated September 6, 1892.

Application filed February 10, 1892. Serial No. 420,990. (No model.)

*To all whom it may concern:*

Be it known that I, JOSEPH CHATTAWAY, a subject of the Queen of Great Britain, residing at Petoskey, in the county of Emmet and State of Michigan, have invented certain new and useful Improvements in Sawbucks, of which the following is a specification.

My invention is an attachment for sawbucks, and is designed to provide means for holding the logs securely while being separated into smaller pieces by sawing, preventing its turning and rendering unnecessary the holding of the log by the foot or knee of the person manipulating the saw.

Figure 1:
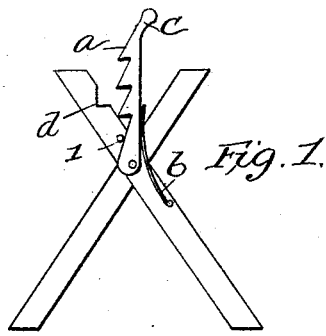
Figure 2:
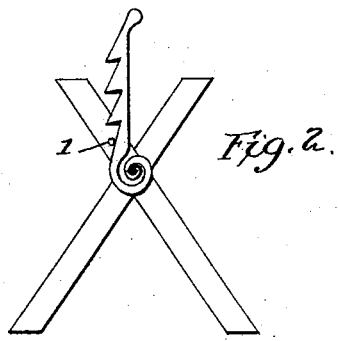
Figure 3:
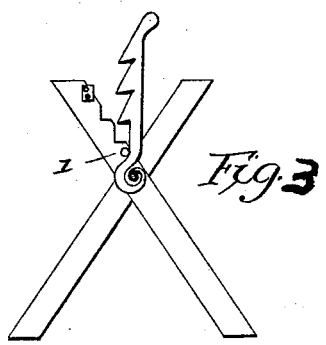

In the drawings, Figure 1 represents one form of my attachment in which the dog and spring are separate, while Figs. 2 and 3 show the dog having its lower end made of spring metal and attached so as to exert a constant tension upon the dog, so as to force its teeth into the log.

In the drawings an ordinary form of sawbuck is shown, and it will be understood that this is representative of any of the known forms of bucks and may be rigidly constructed or made to fold as desired.

In Fig. 1 I attach to one end of the buck by a bolt or nut, or in any other suitable manner, a dog $a$, which may be made of wood, and this is provided with teeth, which teeth may be faced with metal or made up of a plate provided with teeth and attached to the dog. A leaf-spring $b$ is arranged in rear of the dog to press thereon, and the dog is provided with a handle $c$ at its upper end, so that it may be forced back against the pressure of the spring to insert the log to be cut.

In order to provide a bearing for the log upon the upper arms of the buck and prevent it from being crowded upwardly by the pressure exerted upon it by the spring-dog, I form a notch $d$ in each arm of the buck on one side, and this presents a vertical face which provides a bearing for the log. A single notch may be found necessary, but a series of notches may be provided, as shown in Fig. 4.

Instead of the simple form of dog shown in Fig. 1 I may make the dog of metal and have the lower end of spring metal, so that it will exert a tension upon the upper part of the dog without the independent spring shown at Fig. 1. I have shown in Figs. 2 and 3 different forms of this manner of constructing the dog.

As in some cases the arms of the buck may not be made of sufficiently strong material or of sufficient width to permit of notches, I may overcome this by simply attaching plates to the sides of the arm, allowing one corner to project, which thus gives me a bearing answering the same purpose of the notch without weakening the arms of the buck. It will be seen that the action of the dog is automatic, the teeth slanting downwardly, so that the pressure of the log or stick of wood forces it backward to allow of the insertion of the stick between the dog and the rims of the buck, the teeth preventing, however, the upward movement or displacement of the log. A stop $l$ limits the movement of the dog.

I claim as my invention—

In combination with a sawbuck, a toothed dog pivoted to the cross-legs at or near the intersection thereof and extending vertically between them when in normal position and under spring tension, substantially as described.

In testimony whereof I affix my signature in presence of two witnesses.

JOSEPH CHATTAWAY.

Witnesses:
GEO. E. SPRANG,
C. B. HENIKA.